United States Patent
Poff et al.

(10) Patent No.: US 8,051,703 B2
(45) Date of Patent: Nov. 8, 2011

(54) METHODS FOR USING A FLUID STREAM TO TEST A HONEYCOMB BODY

(75) Inventors: David Lewin Poff, Pilot, VA (US); Darin Wayne Felty, Elliston, VA (US); John W Mikels, Riner, VA (US); Robert A Smith, Riner, VA (US)

(73) Assignee: Corning Incorporated, Corning, NY (US)

( * ) Notice: Subject to any disclaimer, the term of this patent is extended or adjusted under 35 U.S.C. 154(b) by 450 days.

(21) Appl. No.: 12/394,129

(22) Filed: Feb. 27, 2009

(65) Prior Publication Data

US 2010/0218596 A1 Sep. 2, 2010

(51) Int. Cl.
 *G01M 3/02* (2006.01)
 *G01N 19/04* (2006.01)
(52) U.S. Cl. .......................................... 73/37; 73/150 A
(58) Field of Classification Search ........... 73/37, 150 A
 See application file for complete search history.

(56) References Cited

U.S. PATENT DOCUMENTS

| | | | |
|---|---|---|---|
| 3,581,557 A * | 6/1971 | Drees et al. ....................... 73/37 |
| 3,885,977 A | 5/1975 | Lachman et al. | |
| 4,483,944 A | 11/1984 | Day et al. | |
| 4,855,265 A | 8/1989 | Day et al. | |
| 5,183,608 A | 2/1993 | Guile | |
| 5,258,150 A | 11/1993 | Merkel et al. | |
| 5,290,739 A | 3/1994 | Hickman | |
| 5,315,861 A * | 5/1994 | Egan et al. ....................... 73/37 |
| 5,341,685 A * | 8/1994 | Malone ........................... 73/827 |
| 5,629,067 A * | 5/1997 | Kotani et al. ................. 428/116 |
| 6,210,626 B1 | 4/2001 | Cornelius et al. | |
| 6,319,870 B1 | 11/2001 | Beall et al. | |
| 6,368,992 B1 | 4/2002 | Beall et al. | |
| 6,432,856 B1 | 8/2002 | Beall et al. | |
| 6,620,751 B1 | 9/2003 | Ogunwumi | |
| 6,773,657 B2 | 8/2004 | Beall et al. | |
| 6,849,181 B2 | 2/2005 | Ogunwumi et al. | |
| 6,864,198 B2 | 3/2005 | Merkel | |
| 6,942,713 B2 | 9/2005 | Ogunwumi et al. | |
| RE38,888 E | 11/2005 | Beall et al. | |
| 2004/0020846 A1 | 2/2004 | Ogunwumi et al. | |
| 2004/0029707 A1 | 2/2004 | Beall et al. | |
| 2004/0092381 A1 | 5/2004 | Beall et al. | |
| 2004/0261384 A1 | 12/2004 | Merkel et al. | |
| 2005/0046063 A1 | 3/2005 | Toda et al. | |
| 2006/0216466 A1 * | 9/2006 | Yoshida ........................ 428/116 |
| 2006/0292342 A1 * | 12/2006 | Ohno et al. ................... 428/116 |

FOREIGN PATENT DOCUMENTS

| | | |
|---|---|---|
| WO | 2004011386 A1 | 2/2004 |
| WO | 2005046840 A1 | 5/2005 |
| WO | 2006015240 A2 | 2/2006 |

* cited by examiner

*Primary Examiner* — Hezron E Williams
*Assistant Examiner* — Nathaniel Kolb
(74) *Attorney, Agent, or Firm* — Walter M. Douglas (57) ABSTRACT

Methods are provided for testing a honeycomb body comprised of a core portion comprising honeycomb cell walls and a circumferential skin portion overlying at least some outer honeycomb cell walls. The circumferential skin portion includes a cement mixture layer. The method comprises the step of directing a fluid stream from a pressurized fluid source at the honeycomb body. The fluid stream is capable of separating at least part of the skin portion from the outer honeycomb cell walls when the adherence between at least part of the skin portion and the outer honeycomb cell walls is below a minimum threshold. In one example, the method further comprises the step of inspecting at least part of the interface between the honeycomb body and the skin portion during or after directing the fluid stream at the honeycomb body. In further examples, an apparatus is provided for testing the honeycomb body.

18 Claims, 5 Drawing Sheets

METHODS FOR USING A FLUID STREAM TO TEST A HONEYCOMB BODY

TECHNICAL FIELD

The present invention relates generally to a method and apparatus for testing a honeycomb body, and more particularly, to a method and apparatus for testing a honeycomb body comprised of ceramic or ceramic-forming material.

BACKGROUND

Conventional honeycomb bodies are known to include a core portion with honeycomb cell walls and a circumferential skin portion overlying outer honeycomb cell walls of the core portion. The honeycomb bodies are extruded from a batch material, dried to remove excess moisture and then fired to complete the processing of the honeycomb bodies. Unfortunately, it sometimes happens that during the firing process at least partial separation of the skin portion from the core portion can occur. When the skin separates from the core portion of the honeycomb after firing the honeycomb may either be discarded or additional processing steps must be taken to mend the skin.

SUMMARY

In one aspect, a method of testing a honeycomb body comprised of a core portion comprising honeycomb cell walls and a circumferential skin portion overlying at least some outer honeycomb cell walls, the circumferential skin portion being comprised of a cement mixture layer, is provided. The method comprises the step of directing a fluid stream from a pressurized fluid source at the honeycomb body. The fluid stream is capable of separating at least part of the skin portion from the outer honeycomb cell walls when the adherence between the at least part of the skin portion and the outer honeycomb cell walls is below a minimum threshold.

In another aspect, a method of testing a bond between an end portion of a honeycomb body and an end portion of a cement mixture layer applied to an outer longitudinal peripheral surface of the honeycomb body is provided. The method comprises the steps of applying a force to the end portion of the cement mixture layer with a fluid stream, and inspecting the bond between the end portion of the honeycomb body and the end portion of the cement mixture layer after applying the force.

In yet another aspect, an apparatus for testing a bond between a honeycomb body and a cement mixture layer applied to an outer longitudinal peripheral surface of the honeycomb body, is provided. The apparatus comprises a testing zone and a conveyor system configured to transport the honeycomb body to the testing zone. The apparatus further comprises at least one nozzle positioned over the conveyor system and configured to direct pressurized fluid against an upwardly extending end portion of the cement mixture layer.

In another aspect, an apparatus and method are provided for testing a bond between an end portion of a honeycomb body and an end portion of skin layer formed on the outer longitudinal peripheral surface of the honeycomb body during extrusion. The method comprises the steps of applying a force to the end portion of the skin layer with a fluid stream, and inspecting the bond between the end portion of the honeycomb body and the end portion of the skin layer after applying the force.

It is to be understood that both the foregoing general description and the following detailed description present example and explanatory embodiments of the invention, and are intended to provide an overview or framework for understanding the nature and character of the invention as it is claimed. The accompanying drawings are included to provide a further understanding of the invention and are incorporated into and constitute a part of this specification. The drawings illustrate various example embodiments of the invention, and together with the description, serve to explain the principles and operations of the invention.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION

The present invention will now be described more fully hereinafter with reference to the accompanying drawings in which example embodiments of the invention are shown. However, this invention may be embodied in many different forms and should not be construed as limited to the embodiments set forth herein. Like reference numbers refer to like elements throughout the various drawings.

Descriptions of the materials used to prepare ceramic honeycomb substrates can be found in numerous patents and patent applications. Examples of ceramic batch material compositions for forming cordierite honeycombs are disclosed in U.S. Pat. Nos. 3,885,977; RE 38,888; 6,368,992; 6,319,870; 6,210,626; 5,183,608; 5,258,150; 6,432,856; 6,773,657; 6,864,198; and U.S. Patent Application Publication Nos. 2004/0029707, 2004/0261384, and 2005/0046063. Examples of ceramic batch material compositions for forming aluminum titanate honeycombs that can be used in practicing the present invention are those disclosed in U.S. Pat. Nos. 4,483,944; 4,855,265; 5,290,739; 6,620,751; 6,942,713; 6,849,181; U.S. Patent Application Publication Nos.: 2004/0020846; 2004/0092381; and in PCT Application Publication Nos. WO 2006/015240; WO 2005/046840; and WO 2004/011386.

As set forth in the drawings, example methods of testing a honeycomb body 20, along with an example apparatus that can be used with the method, are disclosed. Honeycomb bodies can be used in various filtering applications. For instance, honeycomb bodies can be used as a particulate filter for processing exhaust from a combustion engine. In some examples, the honeycomb bodies may be loaded with a catalyst to reduce nitrogen oxide compounds or other environmental pollutants. Various materials may be used to form the honeycomb bodies. For instance, honeycomb bodies may be comprised of ceramic material such as cordierite, mullite, silicon carbide, aluminum titanate or other materials or combinations thereof. During production of the ceramic honeycomb body, raw materials such as inorganic materials a liquid vehicle and a binder are mixed into a batch. The batch is then extruded into a green honeycomb body. The green body can then be heated and dried, and then further heated and processed into a fired honeycomb body of refractory material, such as ceramic. As used herein, the term honeycomb body includes any kind of structure defining a network of parallel cells, whatever the geometry of the cells may be, and the term bonding is intended to cover any method of forming the connection between the core portion and the skin, such as by adhesives, welding, brazing, co-extrusion, coating, or any other suitable means described herein or known to one of skill in the art.

Figure 1:
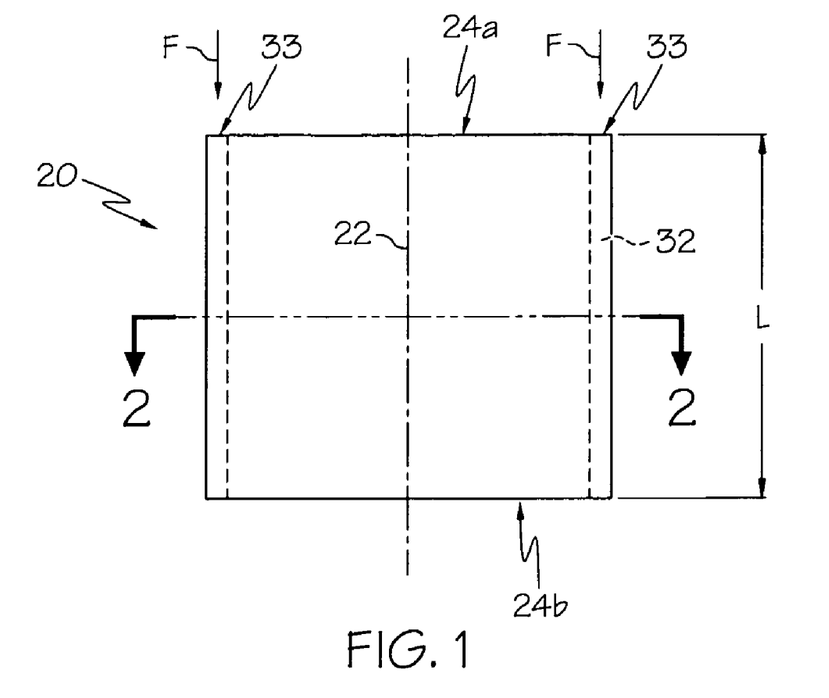
FIG. 1 is a front view of an example honeycomb body to be tested in accordance with aspects of the present invention.

The honeycomb body can comprise various structural configurations depending on the particular application. Generally, the honeycomb body 20 can be comprised of a core portion comprising honeycomb cell walls. The cell walls can define a plurality of channels 21 extending through the honeycomb body. For example, as shown in FIG. 1, the honeycomb body 20 can include a longitudinal axis 22, such as the illustrated symmetrical axis, extending through opposing end faces 24a, 24b. As shown, each of the end faces 24a, 24b can be substantially planar but may have different configurations in further examples. As further illustrated, the end faces 24a, 24b can be substantially parallel to one another although the end faces may extend at an angle to one another in further examples. Still further, one or both of the end faces 24a, 24b can be substantially perpendicular to the longitudinal axis 22 as shown in FIG. 1. The ceramic honeycomb body 20 of FIG. 1 is not drawn to scale and illustrates one example schematic representation of articles that can be utilized with aspects of the present invention.

Figure 2:
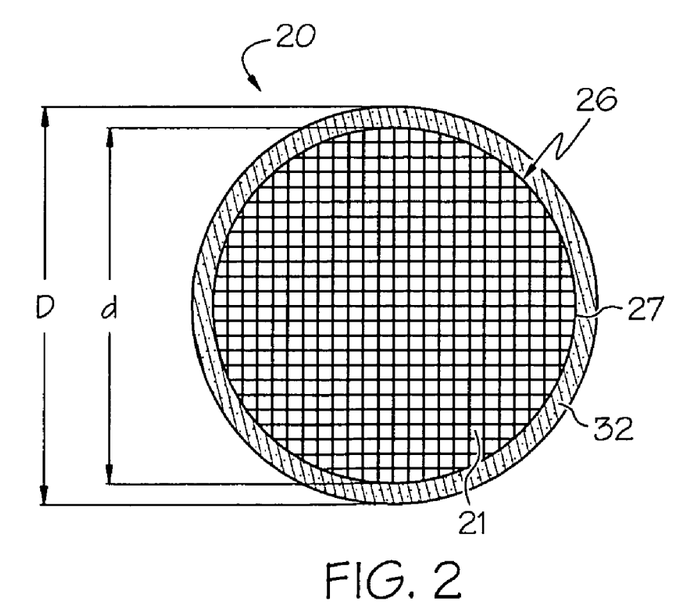
FIG. 2 is a top sectional view taken along line 2-2 of FIG. 1.

The honeycomb body can further include various shapes and sizes. For instance, as shown in FIGS. 1-2, the honeycomb body 20 can have a length "L" approximately equal to an outer dimension "d" although the length "L" may be substantially greater or less than the outer dimension "d" in further examples. The honeycomb bodies can also include a cylindrical surface extending about the longitudinal axis between the end faces. In examples, the cylindrical surface can have a cross sectional shape substantially equal or geometrically similar to the peripheral shape of at least one of the end faces 24a, 24b.

The illustrated honeycomb body 20 includes a cylindrical surface 26 extending about the longitudinal axis 22 between the end faces 24a, 24b. As shown in FIG. 2, the cylindrical surface 26 has a cross section with a substantially circular periphery wherein the outer dimension "d" comprises the diameter of the circle. As shown, the actual cylindrical surface can comprise exposed portions of the partial channels 21 although a substantially continuous cylindrical surface may be provided in further examples which can depend on the extrusion die configuration. An interface 27 is shown in FIG. 2 indicating the outer dimension "d" of the cylindrical surface 26, which in one example can be considered a boundary of the core portion. Although not shown, the cylindrical surface can comprise an oval shape or other curvilinear shape. In further examples, the cylindrical surface may have a triangular, rectangular square or other polygonal shape in addition to the circular cylindrical shape illustrated in FIG. 2.

As further illustrated in FIG. 2, the channels 21 can extend along a direction of the longitudinal axis 22. In further examples, the channels may extend along other directions to provide communication between the end faces 24a, 24b. As shown, the channels 21 can be provided as a matrix of channels defined by adjacent sidewalls. The illustrated sidewalls provide each interior channel with a substantially square shape. In further examples, the channels can comprise circular, oval or other curvilinear shape. In still further examples, the channels can comprise other polygonal shapes with three or more sides.

The honeycomb body 20 can further include a circumferential skin portion overlying at least some outer honeycomb cell walls. As shown, the circumferential skin portion can include an outer dimension "D" and comprises a cement mixture layer 32. As used herein, the term "cement mixture layer" is meant to include, without limitation, a skin that is formed with honeycomb during extrusion techniques. For example, the circumferential skin portion can be co-extruded when the batch is initially extruded into a green honeycomb body. The term "cement mixture layer" is also meant to include, without limitation, a skin that is placed on a honeycomb during a subsequent processing technique. For example, initial extrusion of the honeycomb can be carried out. The cement mixture layer 32 can then be coated or otherwise applied to the outer surface of the honeycomb body. For instance the cement mixture layer 32 can be applied immediately after initial extrusion. In another example, the cement mixture layer 32 can be applied sometime after initial extrusion and before drying the honeycomb into a green body. In still further examples, the cement mixture layer 32 can be applied after the honeycomb dried into a green body. In still further examples, the cement mixture layer 32 can be applied after the honeycomb body is fired.

The cement mixture layer 32 can comprise various materials that are compatible with the material of the honeycomb body and may be formed from substantially the same material as the honeycomb body 20 or the materials from which the honeycomb body 20 is formed, such as inorganic materials, a binder and/or a liquid vehicle. The cement mixture can also be made from green body, dried green body or calcined honeycombs of the same batch mixture (recycled material) that has been damaged and would otherwise have to be discarded.

The circumferential skin portion, such as the cement mixture layer 32 and/or other layers, can provide an outer surface that is generally consistent without discontinuities. In addition, the circumferential skin portion can extend along substantially the entire length "L" of the honeycomb body 20, though may alternatively have a length more or less than the length of the honeycomb body. Similarly, the circumferential skin portion can extend around substantially the entire perimeter of the honeycomb body 20, though may alternatively extend less than the entire perimeter of the honeycomb body.

It can be desirable to determine whether the bond strength between the circumferential skin portion and the core portion is above a minimum threshold. Generally, where the bond strength is above a minimum threshold, it is less likely that the circumferential skin portion will separate from the core portion, which can result in a higher percentage of marketable products. Conversely, where the bond strength is below a minimum threshold, it is generally more likely that the circumferential skin portion will separate at least partially from the core portion, which can thereby result in a non-marketable waste product. For example, during a labor and time-intensive firing process, at least partial separation of the skin portion from the core portion may occur. Thus, in examples of the present invention, it may be desirable to provide a method of detecting skin separation faster and earlier in the manufacturing process, such as when the ceramic substrate is in a green state (i.e., a ceramic green body).

Accordingly, provided herein is a method for testing and an example apparatus that can be used with the method as a green inspection tool to detect skin separation and/or weak knitting of the skin to the core portion on ceramic substrates. The test methods described herein can be relatively fast, such as requiring less than about 5 minutes or more per part, though various other amounts of time can be used.

The method can include the step of applying a force to the circumferential skin portion, wherein the force is capable of separating at least a portion of the circumferential skin portion from the outer honeycomb cell walls when the adherence between the at least part of the skin portion and the outer honeycomb cell walls is below a minimum threshold. The minimum threshold can vary depending upon the materials, geometry, and/or construction methods used for either or both of the core portion and the skin portion. For example, the minimum threshold can be determined as a minimum adherence or adhesion force that maintains one example skin portion bonded to one example core portion. In another example, the minimum threshold can be determined as a factor of the minimum adherence or adhesion force that is relatively lesser or greater than the minimum force and provides a factor of error determined to provide an acceptable percentage of marketable products.

The force can be applied to the circumferential skin portion in various manners. In one example, the force can be applied to an end portion of the circumferential skin portion, such as about the interface 27 of the core portion and/or generally toward either or both of the opposing end faces 24a, 24b. For example, as shown in FIG. 1, the force F can be applied to an end portion of the honeycomb body 20, such as an end portion of the cement mixture layer 32. Still, the force F can be applied to various other portions of the honeycomb body and/or at various angles. Though two arrows are illustrated, it is to be appreciated that a single force, or a plurality of forces, can be applied to the end portion of the cement mixture layer 32, such as simultaneously or sequentially.

The force F can be applied in various manners. In one example, the force F can be applied via mechanical means, such as by a probe (not shown) or the like. In another example, the force F can be applied via a fluid stream from a pressurized source. For example, the fluid stream can be directed at the honeycomb body 20, such as at an end portion of the cement mixture layer 32 (i.e., along the direction of arrow F). In the shown example, the fluid stream can be directed at the honeycomb body 20 such that the force F impinges on the interface 27 between the cell walls and the cement mixture layer 32. In another example, the fluid stream can be adapted to create a pressure differential acting upon a portion of the cement mixture layer 32 that encourages the cement mixture layer 32 to be detached from the core portion. As will be discussed more fully herein, various attributes of the force F can be adjusted, such as the amount of force, time of application, direction of application, etc.

Next, the method can further comprise the step of inspecting at least part of the interface between the honeycomb body 20 and the cement mixture layer 32 during or after applying the force (e.g., directing the fluid stream) at the honeycomb body 20. For example, the step can comprise inspecting the bond between the end portion of the honeycomb body 20 and the end portion of the cement mixture layer 32 after applying the force. Generally, upon inspection, if the ceramic substrates come out of the force application process with the skin intact, then it is likely that the part should be robust and should provide a marketable part after firing. Conversely, if a portion of the skin is blown off or otherwise at least partially separated from the core portion, then the part may have a relatively high probability of providing an unacceptable, non-marketable part after firing. Additionally, based upon the results of the inspection, adjustments can be made to the manufacturing process of the green state product to improve the knitting quality (i.e., bond) between the core portion ad the skin.

The inspection process can be performed in various manners. In one example, the inspection may be performed manually via visual inspection, such as by an operator's eye. In addition or alternately, the inspection can be performed via an automated detection system, such as by computer analysis of optical images of the honeycomb body, or various other non-destructive testing techniques known to one of skill in the art. Either or both of the manual or automated inspection processes may further include mechanical, electrical, and/or chemical tests and associated equipment adapted to provide various measurements or other data that can be analyzed.

Figure 3:
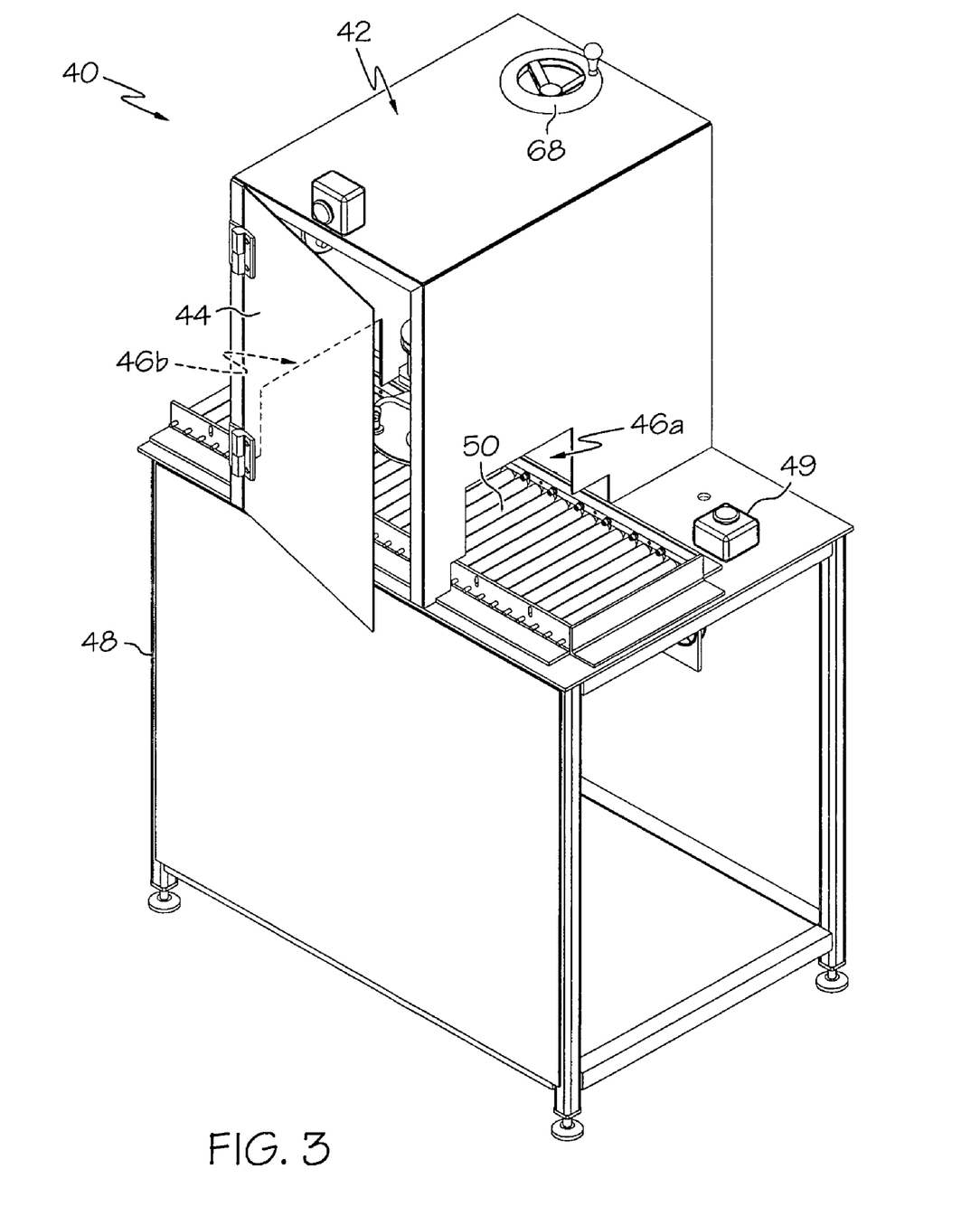
FIG. 3 is a perspective view of an example apparatus for testing in accordance with aspects of the present invention.
Figure 4:
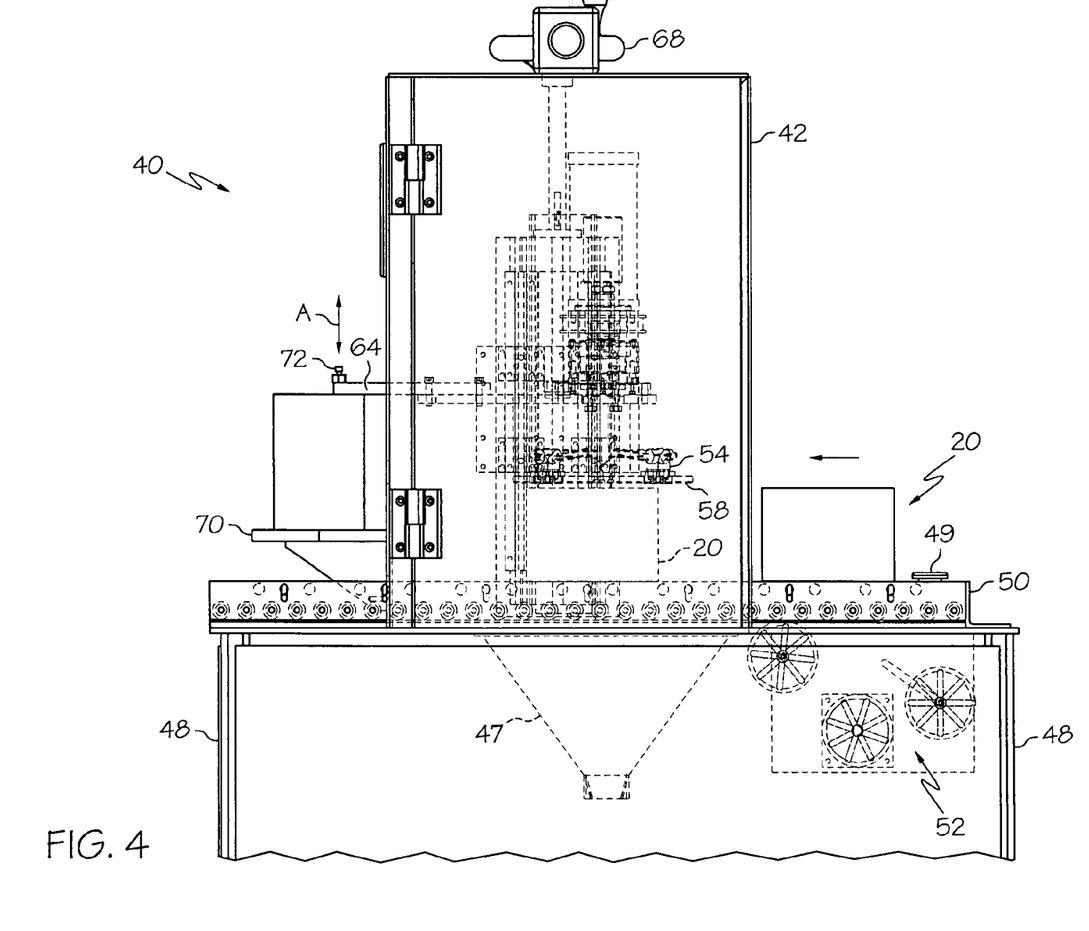
FIG. 4 is a front detail view of the example apparatus for testing of FIG. 3.
Figure 5:
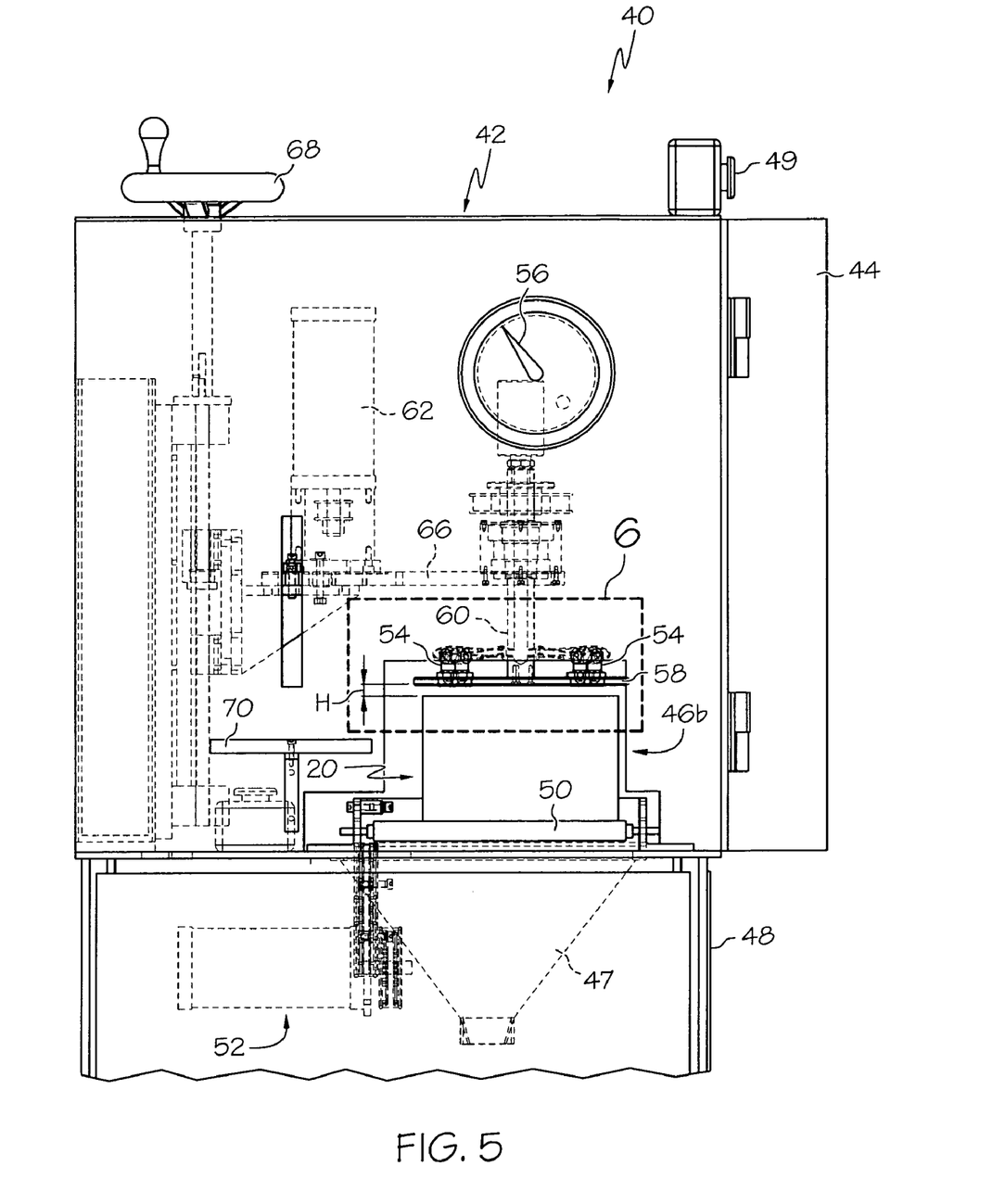
FIG. 5 is a side detail view of the example apparatus for testing of FIG. 3.

Turning now to FIGS. 3-5, an example apparatus 40 will now be discussed for performing the aforedescribed testing method. Additionally, various other aspects of the testing method will be further described. It is to be understood that the following discussion is intended to merely illustrate one example apparatus 40 that can be used to perform the testing method, and that various other similar or different apparatuses can also be utilized.

The testing apparatus 40 can generally comprise a testing zone 42 for performing the testing method. It can be beneficial to partially or completely bound the testing zone 42, such as by walls, panels, or the like, to protect against possible flying debris released from the honeycomb body 20. For example, as shown, the testing zone 42 can be bounded by on all sides by a protective cage or box, any of which can be transparent, translucent, or opaque. Any or all of the sides can be movable, such as door 44, to provide access to the interior of the testing zone 42.

The testing apparatus 40 and testing zone 42 can each include additional features. For example, some or all of the sides can include an opening, such as side openings 46a, 46b, to permit the honeycomb bodies to enter and exit the testing zone as will be described more fully herein. In another example, the testing zone 42 can be disposed upon a stand 48 or the like, though the testing zone 42 can be supported variously, such as at various locations within a manufacturing or testing facility. For clarity, the stand 48 is only partially shown in FIGS. 4-5. In yet another example, the testing zone 42 can include a collection zone 47 or the like for collecting debris that may be released from the honeycomb bodies 20 during the testing process. In addition or alternatively, the testing apparatus 40 can also include various safety features. In one example, one or more emergency stop buttons 49 or the like can be used to automatically stop some or all operation of the apparatus 40.

Each honeycomb body 20 to be tested can be manually or automatically inserted into and removed from the testing zone 42. In one example, the honeycomb bodies 20 can be manually placed into the testing zone 42 via the door 44. In another example, the apparatus 40 can comprise a conveyor apparatus 50 driven by a motor assembly 52 or the like, or even manually, to transport the honeycomb body 20 into the testing zone 42. Consequently, the method can further comprise the step of moving the honeycomb body 20 into the testing zone with the conveyor apparatus 50. As shown, the conveyor apparatus 50 can include a plurality of rollers arranged in a generally linear path extending through the testing zone 42. The conveyor apparatus 50 can also extend a distance outwards of the testing zone 42 on either side so as to permit the honeycomb bodies 20 to enter and exit the testing zone 42. In addition or alternatively, the conveyor apparatus 50 can be adapted to interface with additional conveyors or the like (not shown) such that a plurality of honeycomb bodies 20 can progress through the testing zone 42 generally continuously.

The conveyor apparatus 50 can be adapted to move the honeycomb bodies 20 through the testing zone 42 in various manners and at various speeds. In various examples, the conveyor apparatus 50 can move the honeycomb bodies 20 through the testing zone at a generally constant speed, or even at varying speeds. For example, the conveyor apparatus 50 can be adapted to move the honeycomb bodies 20 through the testing zone at a rate within a range of about 1 inch per second to about 20 inches per second. In another example, the conveyor apparatus 50 can move the honeycomb bodies 20 through the testing zone in a stop-start fashion, such that the body to be tested progresses into the testing zone 42, pauses for one or more times during testing, and then progresses out of the testing zone 42. In any case, the step of applying the force with the fluid stream can be conducted within the testing zone 42.

As stated previously, the test force F applied to an end portion of the honeycomb body 20 can be applied via a fluid stream from a pressurized source. In one example, at least one nozzle can be used to create the fluid stream. In another example, as shown in FIGS. 4-5, a plurality of nozzles 54 can be used to create one or more fluid streams. Various numbers of nozzles can be used, such as between 2-8 nozzles, or even more. It is to be understood that the nozzles 54 can be configured to create a single fluid stream directed at the honeycomb body 20, or a plurality of fluid streams directed at the honeycomb body 20. For example, the amount of force F applied by the fluid stream to the cement mixture layer 32 may be adjusted by providing more or less nozzles.

Each of the nozzles 54 can be in fluid communication with a pressurized source of fluid. The pressurized source can be provided within the apparatus 40, such as by a pump, pressurized tanks, or the like, or can be provided from an external source, such as shop air or the like. In the shown example, pressurized air is used, though various other fluids can be used, such as various liquids or gasses or mixtures thereof. Thus, each of the nozzles 54 can be adapted to direct the pressurized fluid towards the honeycomb body 20 for testing the bond strength between the core portion and the skin portion. In one example, the fluid can be pressurized within a range of about 20 pounds per square inch to about 100 pounds per square inch, though various other pressures can also be used. For example, the amount of force F applied by the fluid to the cement mixture layer 32 may be adjusted by adjusting the pressure. Moreover, each nozzle 54 can emit the fluid at the same pressure, or even at different pressures. In addition or alternatively, the apparatus 40 can include a pressure gauge and/or pressure regulator 56 for viewing and/or adjusting the pressure emitted by the nozzles 54.

The nozzles 54 can be adapted to emit the fluid at an angle relative to the honeycomb body 20. In one example, some or all of the nozzles 54 can be adapted to emit the fluid at an angle generally perpendicular to one end face 24a of the honeycomb body 20. In other examples, some or all of the nozzles 54 can be adapted to emit the fluid at various other angles, such as between 45-90 degrees, or other angle, relative to the end face 24a. In addition or alternatively, the nozzle angles can be fixed or selectively adjustable. Variations in the number, locations, angles, and/or operative pressures of the nozzles 54 can provide various fluid streams. Additionally, such variations may create a desired amount of turbulence about the honeycomb body 20 that can encourage separation of the skin portion from the core portion.

Thus, in the illustrated example, the green honeycomb bodies 20 are vertically placed on the conveyor apparatus 50 and travel at a certain speed into, through, and out of the testing zone 42. While the honeycomb body 20 is within the testing zone 42, pressurized air from the nozzles applies a force F to an end portion of the honeycomb body 20, such as an end portion of the cement mixture layer 32. In one example, the pressurized air can apply the force F to the honeycomb bodies 20 while the bodies travel through the testing zone 42 and past the nozzles 54, though in an alternative example the honeycomb bodies 20 can pause for an amount of time near the nozzles 54.

In addition or alternatively, the method can further include the step of rotating at least one of the nozzle 54 and the honeycomb body 20 relative to the other of the nozzle 54 and the honeycomb body 20 while applying the force to the cement mixture layer 32. In one example, as shown, some or all of the nozzles 54 can be designed to rotate while the honeycomb body 20 to be tested remains stationary. Alternatively, the honeycomb body 20 can rotate while some or all of the nozzles 54 remain stationary. In yet another example, both of the both of the nozzles 54 and the honeycomb body 20 can rotate, either in the same or different directions and/or rotational speeds.

In the shown example, some or all of the nozzles 54 can be designed to rotate generally about an axis generally parallel to the longitudinal axis 22 of the honeycomb body 20. Thus, the fluid stream can be used to apply the force F to an end portion of the honeycomb body 20 as the nozzles 54 and honeycomb body 20 rotate relative to one another. The relative rotation can be generally within a range of about 200 revolutions per minute to about 1000 revolutions per minute, though various other speeds are also contemplated. In addition or alternatively, the rotational speed can be selectively adjustable.

In one example, some of all of the nozzles 54 can be disposed upon a rotatable member 58 that is coupled to a rotatable shaft 60 driven by a motor 62 or the like. For example, the nozzles 54 can be fixedly attached to the rotatable member 58, which then rotates together with the rotatable shaft 60. The rotatable member 58 can have various sizes and geometries, such as a generally circular disc having a diameter between about 6 inches and about 10 inches. It is to be understood that each of the nozzles 54 coupled to the rotatable member 58 can be in fluid communication with a suitable rotatable pressure fitting, manifold, or the like for receiving the pressurized fluid while permitting rotation. In the shown example, the rotatable shaft 60 can include the suitable rotatable pressure fitting, manifold, or the like. The motor 62 or the like can rotate the rotatable member 58 and attached nozzles 54 at various rotational speeds, such as within the aforedescribed range of about 200 revolutions per minute to about 1000 revolutions per minute, and as before, the rotational speed can be selectively adjustable.

Thus, in the shown example, the nozzles 54 are positioned over the conveyor apparatus 50 and are configured to direct the pressurized fluid against an upwardly extending end portion 33 (see FIG. 1) of the cement mixture layer 32. Additionally, the nozzles 54 are configured to rotate relative to the conveyor apparatus 50 to orbit with respect to the upwardly extending end portion including the end face 24a of the honeycomb body 20.

Figure 6:
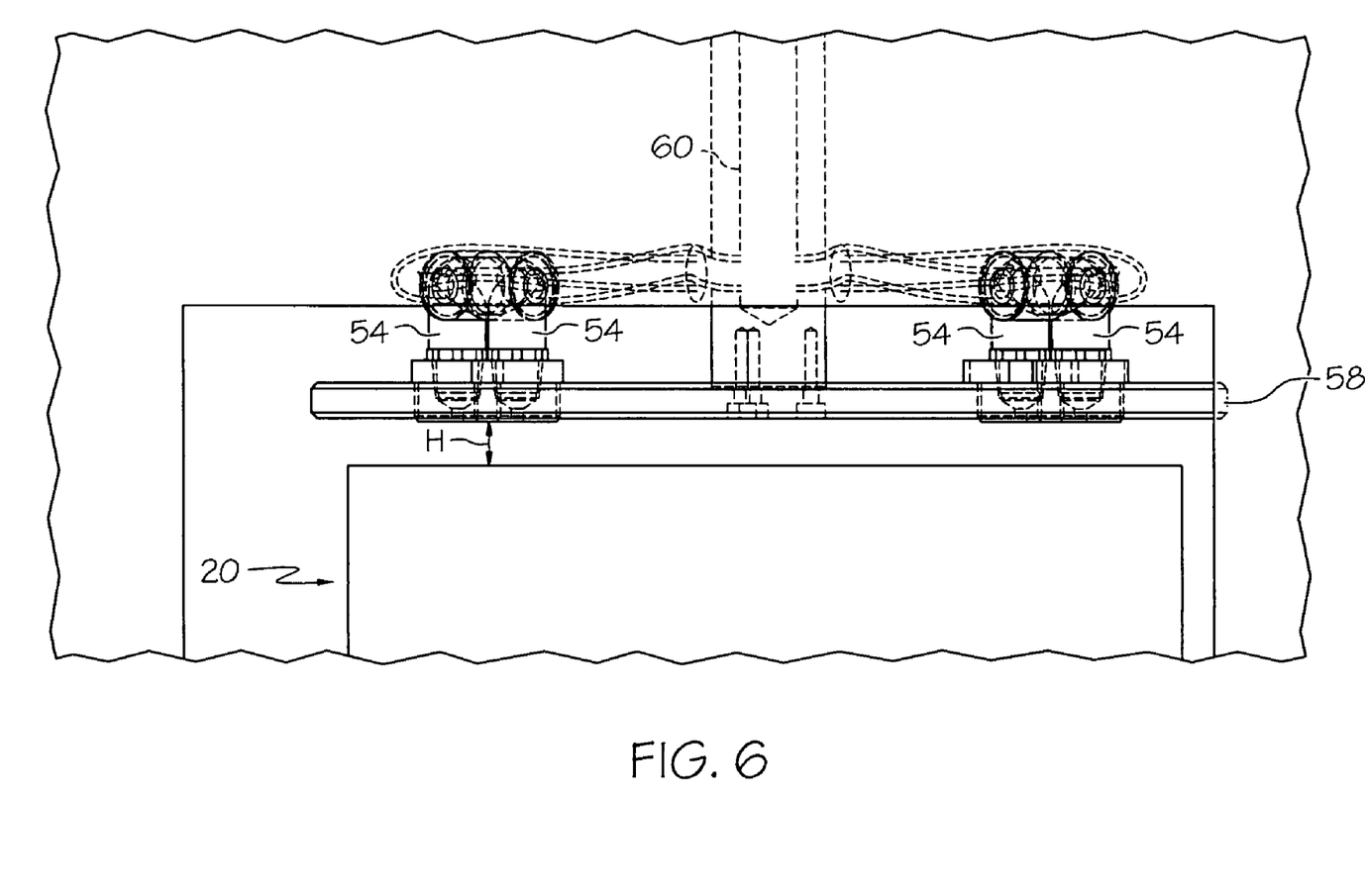
FIG. 6 is a partial detail view of section 6 of FIG. 5.

In addition or alternatively, the method can further include the step of adjusting a distance between the nozzles(s) 54 and the cement mixture layer 32. For example, it may be desired to position the nozzles(s) 54 a particular distance from the upwardly extending end portion 33 of the cement mixture layer 32 for testing. The distance "H" (see FIGS. 5-6) can be selectively variable, such as between about 0.125 inches to about 0.50 inches, though various other distances are contemplated. For example, the amount of force F applied by the nozzles 54 to the cement mixture layer 32 may be adjusted by altering the height "H" of the nozzles 54 above the honeycomb body 20. In the shown example of FIGS. 5-6, the height "H" is illustrated as the distance between the bottom surface of the rotatable member 58 and the honeycomb body 20, where the nozzles 54 are mounted generally flush with the bottom surface of the rotatable member 58. However, the height "H" could also be different if any of the nozzles are recessed into or protrude a distance from the bottom surface of the rotatable member 58.

In the shown example, the apparatus 40 can include a height adjustment member 64 operatively coupled to the nozzles 54 and vertically movable relative to the honeycomb body 20 disposed on the conveyor apparatus 50. For example, the height adjustment member 64 can be coupled to an intermediate member 66 that is coupled to the rotatable member 58 and/or nozzles 54. Thus, vertical movement of the height adjustment member 64 along the direction of arrow A relative to the honeycomb body 20 can adjust the distance between the nozzles(s) 54 and the cement mixture layer 32.

Vertical adjustment of the height adjustment member 64 can be performed manually or automatically. In one example, as shown, the height adjustment member 64 can be operatively coupled to a hand crank 68 or the like that, via a gearing system, can adjust the vertical height of the height adjustment member 64 along the direction of arrow A. Various gearing systems can be used, such as a lead screw design or the like. In other examples, the height adjustment member 64 can be manually lifted into position and locked in place, or can even be vertically movable by an automatic or user-controlled motor or the like.

In one example, the height adjustment member 64 can measure the honeycomb body 20 to be tested relative to the conveyor apparatus 50. In another example, as shown, the apparatus 40 can further include a shelf 70 or the like to provide a relatively more accurate frame of reference for measuring the honeycomb body 20 relative to the height adjustment member 64. Similarly, the height adjustment member 64 may include an adjustable or non-adjustable pin 72 or the like for contacting the honeycomb body 20, which may be fragile in the green body state. In addition or alternatively, indicia or the like (not shown) can be provided to visually indicate the height of the nozzles 54 above the honeycomb body 20.

In addition or alternatively, adjustment of the height adjustment member 64 can be performed automatically via a sensor or the like (not shown) that can sense the height of the honeycomb body 20 and adjust the height of the nozzles 54 automatically based upon a predetermined amount. In one example, the sensor can be operatively coupled to, or even replace, the pin 72, though various other sensors, such as various height detecting sensors, can also be used. In addition or alternatively, the height of the conveyor apparatus 50 can be selectively adjustable relative to the nozzles 54.

It will be apparent to those skilled in the art that various modifications and variations can be made in the present invention without departing from the spirit or scope of the invention. Thus, it is intended that the present invention cover the modifications and variations of this invention provided they come within the scope of the appended claims.

What is claimed is:

1. A method of testing a honeycomb body comprised of a core portion comprising honeycomb cell walls and a circumferential skin portion overlying at least some outer honeycomb cell walls, the circumferential skin portion including a cement mixture layer, the method comprising the steps of:
    directing a fluid stream from a pressurized fluid source at the honeycomb body,
    wherein the fluid stream is capable of separating at least part of the skin portion from the outer honeycomb cell walls when the adherence between the at least part of the skin portion and the outer honeycomb cell walls is below a minimum threshold.

2. The method of claim 1, further comprising inspecting at least part of the interface between the honeycomb body and the skin portion during or after directing the fluid stream at the honeycomb body.

3. The method of claim 1, wherein the honeycomb cell walls are comprised of fired ceramic material.

4. The method of claim 1, wherein the honeycomb cell walls are comprised of green body ceramic forming material.

5. The method of claim 1, wherein the fluid stream is directed at the honeycomb body such that the force impinges on an interface between the cell walls and the skin portion.

6. The method of claim 1, wherein the fluid stream is applied to an end portion of the honeycomb body.

7. The method of claim 1, wherein one or a plurality of nozzles is used to create the fluid stream.

8. The method of claim 7, further comprising the step of rotating the honeycomb body and at least one of the nozzles with respect to one another while applying the force to the cement mixture layer.

9. The method of claim 8, wherein the fluid stream is used to apply the force to an end portion of the honeycomb body as the nozzle and honeycomb body rotate relative to one another.

10. The method of claim 8, wherein the relative rotation is within a range of about 200 revolutions per minute to about 1000 revolutions per minute.

11. The method of claim 7, further including the step of adjusting a distance between the nozzle and the cement mixture layer.

12. The method of claim 1, wherein the fluid is pressurized within a range from about 20 pounds per square inch to about 100 pounds per square inch.

13. The method of claim 1, further comprising the step of providing a testing zone and moving the honeycomb body into the testing zone with a conveyor apparatus, wherein the step of directing the fluid stream is conducted within the testing zone.

14. The method of claim 13, wherein said honeycomb body moves through the testing zone at a rate within a range of about 1 inch per second to about 20 inches per second.

15. A method of testing a bond between an end portion of a honeycomb body and an end portion of a cement mixture layer applied to an outer longitudinal peripheral surface of the honeycomb body, the method comprising the steps of:
    applying a force to the end portion of the cement mixture layer with a fluid stream; and
    inspecting the bond between the end portion of the honeycomb body and the end portion of the cement mixture layer after applying the force.

16. The method of claim 15, further comprising the step of rotating at least one of the fluid stream and the honeycomb body relative to the other of the fluid stream and the honeycomb body while applying the force to the end portion of the cement mixture layer.

17. The method of claim 15, further comprising the step of providing a testing zone and moving the honeycomb body into the testing zone with a conveyor apparatus, wherein the step of applying the force with the fluid stream is conducted within the testing zone.

18. The method of claim 15, wherein the fluid stream is directed at the honeycomb body such that the force impinges on an interface between the honeycomb body and the cement mixture layer.

* * * * *